(12) United States Patent
Qian et al.

(10) Patent No.: US 8,432,271 B2
(45) Date of Patent: *Apr. 30, 2013

(54) DRIVER ALARM FOR PREVENTING CHILDREN FROM BEING LEFT IN CAR

(76) Inventors: Davy Zide Qian, Arcadia, CA (US);
Nicole Minhui Lu, Arcadia, CA (US);
Benyu Qian, Shanghai (CN); Lequn Lu, Shanghai (CN)

( * ) Notice: Subject to any disclaimer, the term of this patent is extended or adjusted under 35 U.S.C. 154(b) by 354 days.

This patent is subject to a terminal disclaimer.

(21) Appl. No.: 12/839,288

(22) Filed: Jul. 19, 2010

(65) Prior Publication Data

US 2011/0025486 A1 Feb. 3, 2011

Related U.S. Application Data

(60) Provisional application No. 61/229,362, filed on Jul. 29, 2009, provisional application No. 61/232,414, filed on Aug. 8, 2009, provisional application No. 61/236,069, filed on Aug. 21, 2009.

(51) Int. Cl.
*B60Q 1/00* (2006.01)
*G08B 1/00* (2006.01)

(52) U.S. Cl.
USPC ..... 340/438; 340/425.5; 340/457; 340/309.7; 340/691.1; 340/691.6

(58) Field of Classification Search .................. 340/438, 340/457, 309.7
See application file for complete search history.

(56) References Cited

U.S. PATENT DOCUMENTS

| | | | | |
|---|---|---|---|---|
| 5,402,108 | A * | 3/1995 | Tabin et al. | 340/575 |
| 6,008,732 | A * | 12/1999 | Lam | 340/815.4 |
| 2010/0063904 | A1* | 3/2010 | Ronen et al. | 705/30 |
| 2011/0285524 | A1* | 11/2011 | Qian et al. | 340/457 |

* cited by examiner

*Primary Examiner* — Donnie Crosland
(74) *Attorney, Agent, or Firm* — Global IP Services; Tianhua Gu

(57) ABSTRACT

A driver alarm for preventing children from being left in a car comprises a power device, a voltage measuring device, an inputting device, a prompting device and a controlling device. The power apparatus has a plug, which can be inserted into a cigarette-lighter socket in the car to become a power source for the driver alarm. The voltage measuring device is used to measure voltage of the cigarette-lighter in the car, the voltage rises when the car is started up and the voltage declines when the engine is turned off. The voltage measuring device reports to the controlling device about voltage rising or voltage declining. The inputting device is designed for a driver to report to the controlling device about whether children are in the cars or not. The promoting device is used to warn driver that there are children inside of the car when the car are started up or when the engines are turned off.

10 Claims, 5 Drawing Sheets

DRIVER ALARM FOR PREVENTING CHILDREN FROM BEING LEFT IN CAR

CROSS REFERENCE TO RELATED PATENT APPLICATION

The present application claims priorities of the U.S. provisional applications No. 61/229,362 filed Jul. 29, 2009, No. 61/232,414 filed Aug. 8, 2009 and No. 61/236,069 filed Aug. 21, 2009, which applications are incorporated herein by reference.

FIELD OF INVENTION

This invention belongs to an electronic communication field. More practically, this invention relates to an area of electronic alarm device.

BACKGROUND OF THE INVENTION

It is dangerous to leave children alone in a locked car, and especially in the summer or winter. That many children have died from heat stroke, hypothermia or suffocation in hot (or freezing) cars has caused tragedies in many families. Most of those tragedies were not caused intentionally by the acts of parents or drivers with children, but by their negligence and forgetfulness. Sometimes, a parent brought a kid out to shop, and the kid fell into a sleep in the car, the busy parent rushed to go to shopping since a lot of housework was waiting for him or her, and forgot the kid(s) who were sleeping in the cars.

The parent locked the car, and as a result, caused a great misfortune, the kid suffocated and died in the extremely hot and locked car. The parent had to take legal responsibilities for the act that he or she caused. In some cases, those parents not only lost their kids, but also ruined their families.

People wish to have a driver alarm for preventing children from being left in the car. The driver's alarm should automatically remind the parent/driver about having kids inside the car when leaving the car; therefore, such tragedies can be avoided. Thus, the driver alarm for preventing children being locked inside of a car is very important.

Some of these kinds of inventions were made before; however no one is seen in the market. The Main reason is these inventions are complicated, and especially, too complicated to install; thus cannot be adopted by the public.

For those reasons, it is important to invent a driver alarm for preventing children from being left in a car (it will be referred to as a driver alarm in the following discussion), which is simple to use and reliable. The driver alarm of the present invention is an alarm that is like a "plug and play" device. It means that the drivers only need to insert the driver alarm into the cigarette-lighter socket in the car, and then the alarm will function properly by itself.

SUMMARY OF THE INVENTION

The inventor discovers that the voltage of a cigarette-lighter socket in a car rises when the car engine is turned on and declines when the engine is turned off. The inventor creatively connects the situations together that when the driver starts the car engine causing the voltage of cigarette-lighter socket to rise, it means the car will be driven away and it's a good time to find out from the driver whether there are any children (or pets) going along inside the car; and when the driver stops the car engine causing the voltage of the cigarette-lighter socket to drop, it means the driver is about to leave the car and it's a good time to remind the driver about not forgetting and leaving any children/pets behind in a locked car. Thereby, the inventor can invent a driver alarm that is simple and reliable.

A driver alarm for preventing children/pets from being left inside of a car comprises: a power device, a voltage measuring device, a prompting device and a controlling device.

Furthermore, an inputting device can be added into the driver alarm.

Said power device has a plug, the plug can be inserted into a cigarette-lighter socket in a car, and the cigarette-lighter socket is used as a power source for the driver alarm.

Said voltage measuring device is used to measure the voltage change of the cigarette-lighter socket in a car and report the measured results to the controlling device. The voltage of the cigarette-lighter socket in a car rises when the engine is started; and the voltage of the cigarette-lighter socket in a car declines when the engine is turned off. The signal of voltage rising or voltage declining is sent to the controlling device, based upon which the controlling device will react to the two different conditions of the engine being started (voltage rising) or the engine being turned off (voltage declining).

Said inputting device is used for a driver to report to the controlling device whether any children or pets are inside of the car or not. The inputting device can be omitted.

Said prompting device sends warning sounds (or verbal questions/prompts) to the driver asking whether children/pets are in the car after the engine is started; and when the engine is turned off it should make verbal warnings/reminders to the driver to avoid leaving children/pets inside a locked car—based upon the driver's response to the question initially.

Said controlling device is well programmed to control the prompting device to warn the driver about children/pets being inside of the car—at an appropriate time.

The controlling device works according to the following programming:

When the controlling device receives a <voltage rising> signal originated from the cigarette-lighter socket in the car via the voltage measuring device (indicating the engine being turned on), the controlling device immediately sends out a <query instruction> to the prompting device. The prompting device receives the <query instruction> and immediately asks the driver if there are children/pets in the car; the driver's response could be <yes> (by pushing the "Yes" button within certain number of seconds) or <no> (by pushing the "No" button within certain number of seconds) or <no response> (by not pushing any button within certain number of seconds when the driver is busy dealing with the traffic and unable to answer the question by pushing the buttons); the inputting device then reports the driver's answer/response to the controlling device.

Once the controlling device receives <yes> signal from the inputting device, the controlling device stores <yes> into the occupancy status memory register, and immediately gives out a <warning instruction> to the prompting device to warn the driver that some children are in the car.

When the controlling device receives <NO> signal from the inputting device, the controlling device sends a <Confirming instruction> to the prompting device to confirm with the driver that there are no children/pets inside the car, at that time the driver will be given a chance to make a correction by pushing the "YES" button again if s/he made a mistake. If no correction is made, then a "NO" value is saved into the occupancy status memory register.

When the controlling device receives <no response> after a certain number of seconds, it promptly sends out another <query instructions> to the prompting device to ask the driver whether there are children in the car, and after repeatedly querying two times without an answer, the controlling device will automatically assume there are children inside the car and saves a "Yes" value into the occupancy status memory register.

When the controlling device receives a <voltage declining> signal originated from the cigarette-lighter socket in the car via the voltage measuring device (indicating the engine is turned off) and retrieves a "yes" answer/value (children in car) from the occupancy memory, then the controlling device sends a "warning instruction" to the prompting device to warn the driver that the children are in the car. But if the occupancy status memory register value is found to be a "NO", then the controlling device doesn't have to do anything.

Thus, the said driver alarm is able to warn the driver that the children are in the car when the car engine is started and when the car engine is turned off.

Due to conception of this invention, said driver alarm is designed to have an advantage of being easy to set up. The driver simply inserts the driver alarm into a cigarette-lighter socket in the car, and then the driver alarm will work effectively from there on. The driver alarm is also designed to work in a simple and reliable way by using the voltage change (of the cigarette-lighter socket) to determine if the car engine is being started hence being driven away, or the car engine is being turned off hence indicating the driver is about to leave the car; and then based upon the driver's self report of the vehicle occupancy status (of children/pets) by pushing either the "YES" button or the "NO" button, or not pushing any bottom which defaults to the same effect of pushing the "YES" button (instead of complicated and potentially unreliable sensor system), to warn/prompt the driver to avoid leaving children/pets in a locked car.

DETAIL DESCRIPTION OF THE INVENTION

Figure 1:
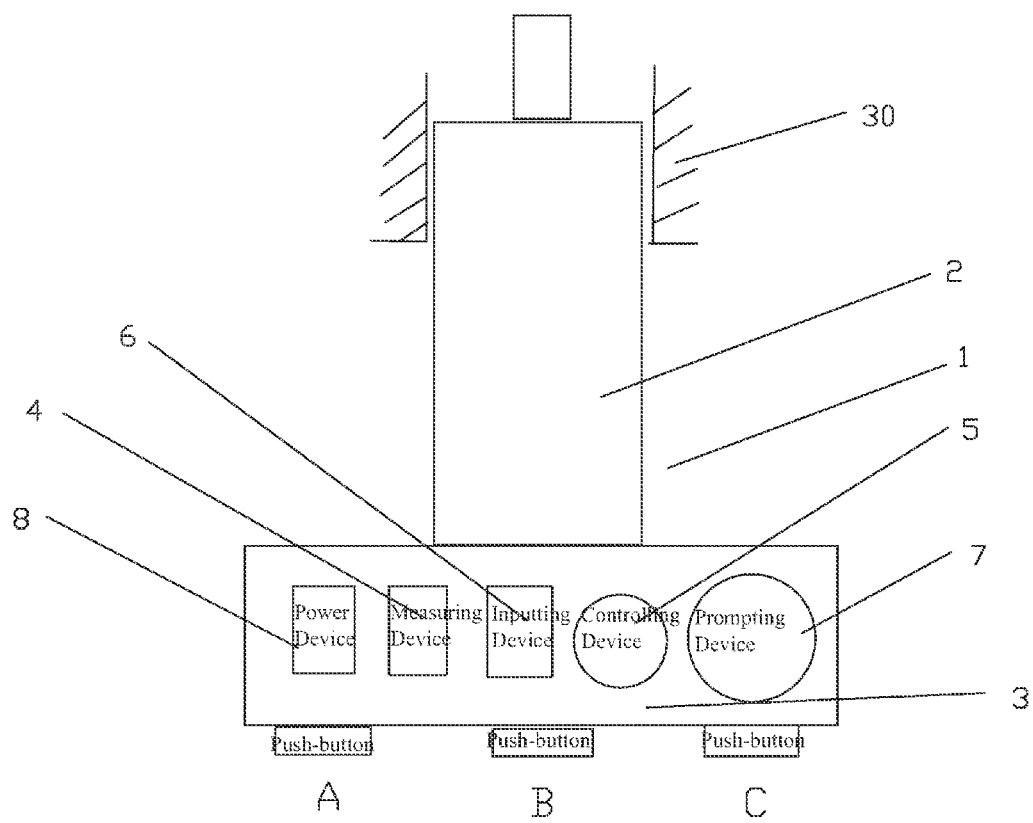
FIG. 1 is a sketch of structure of the driver alarm of present invention.

As showing in FIG. 1, a driver alarm 1 has a T shape and a cylindrical plug 2, which can be inserted into a socket 30 of a cigarette-lighter in car. A main body 3 has an inner part. The inner part contains a power device 8, a measuring device 4, an inputting device 6, a prompting device 7, a controlling device 5 and A, B, C push-buttons. The A, B, C push-buttons are located in the front of the driver alarm for the driver to respond to the query from the controlling device by pushing one of the buttons. The A push-button is set up to indicate the situation that children are inside the car (hence a "Yes" button); B push-button is set up to indicate the situation that there are NO children inside the car (hence a "No" button); C push-button is set up to turn off the driver alarm. The A, B, C push-buttons are flash-buttons, and when the controlling device 5 needs an answer, the buttons begin to blink.

Figure 2:
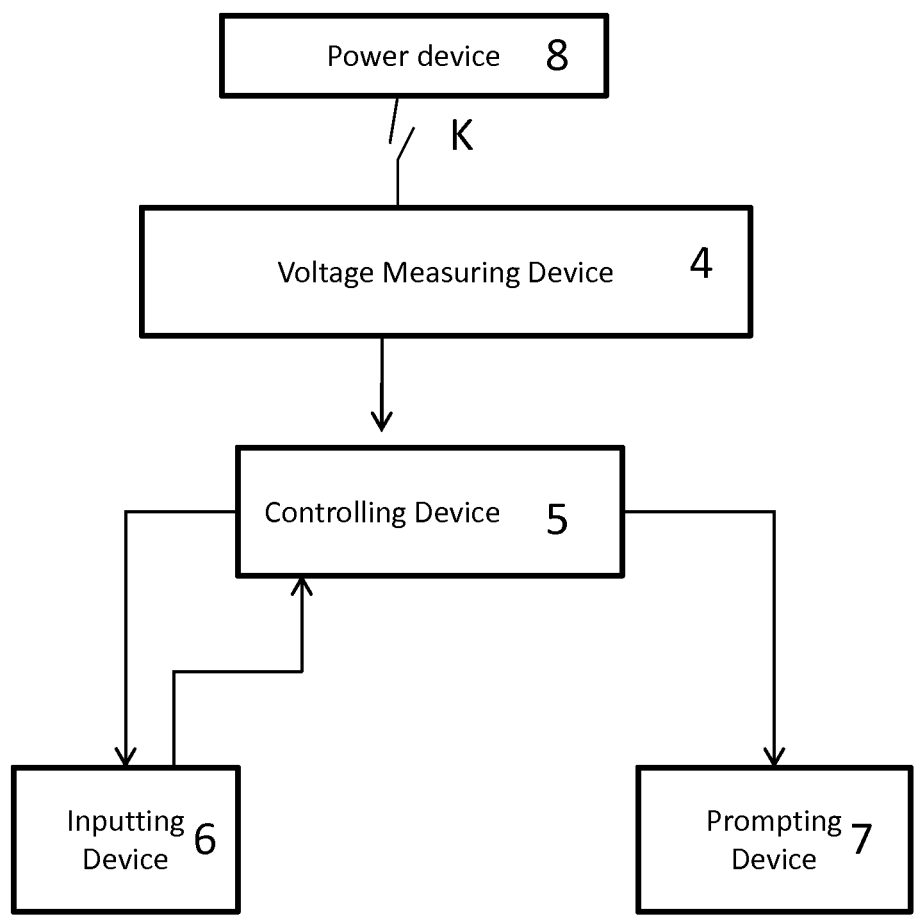
FIG. 2 is a sketch of working theory of the driver alarm of present invention.

Refer to FIG. 2, said driver alarm comprises the power device 8, measuring device 4, inputting device 6, prompting device 7 and controlling device 5. The power device 8 uses car's cigarette-lighter socket as a power source. The voltage measuring device is composed of voltage sensors. The controlling device adopts suitable electronic integrate circuits. The inputting device is composed of A, B, C, three push-buttons. The A push-button is designed to indicate there are children inside the car, the B push-button is designed to indicate there are NO children inside the car, the C push-button is designed to stop the prompting device (or the driver alarm?). The A, B, C push-buttons are flash-buttons, and when the system needs an answer from the driver, the flash-buttons start to blink. The prompting device is composed of an amplifier (loud speaker). The inputting device can be omitted.

Figure 5:
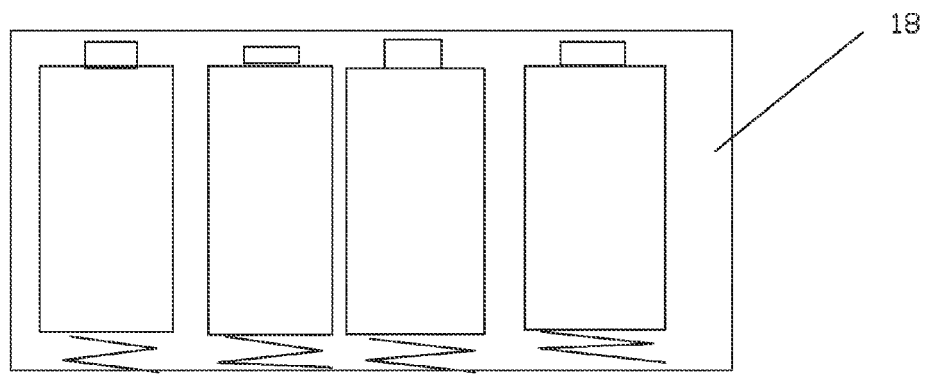
FIG. 5 is another embodiment of the driver alarm, in which a battery box is provide in the power device.

FIG. 5 shows another embodiment of the driver alarm, the power device has a battery box for containing batteries or rechargeable batteries. Instead of using power from the cigarette-lighter socket in a car, by putting batteries or rechargeable batteries inside of the battery box, the power device becomes an independent power source for the driver alarm.

Figure 6:
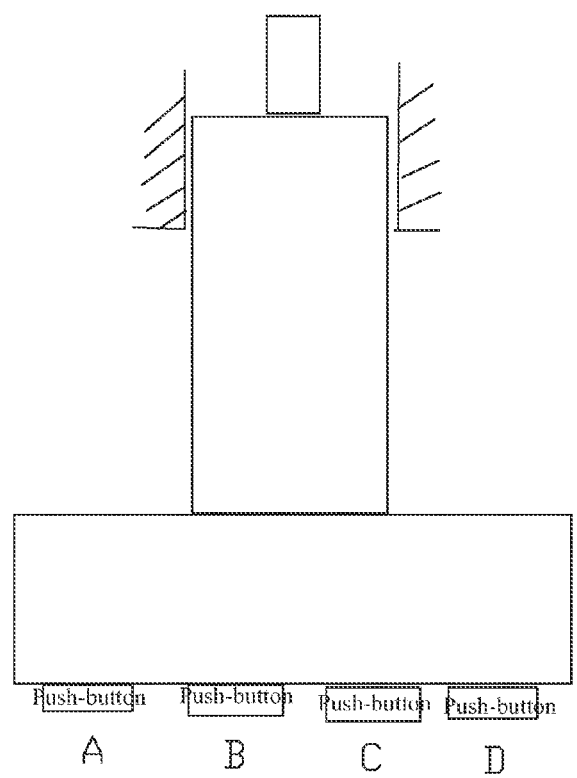
FIG. 6 is another embodiment of the driver alarm, in which a power supplying socket is provided.

FIG. 6 shows another embodiment of the driver alarm. The driver alarm in this case has a power supplying socket D as shown in FIG. 6. The power supplying socket D can be a power source in the car for other electronic devices; it brings much convenience for the driver.

Another embodiment of the driver alarm, the driver alarm has a built-in power switch K (corresponding to C button?).

Figure 3:
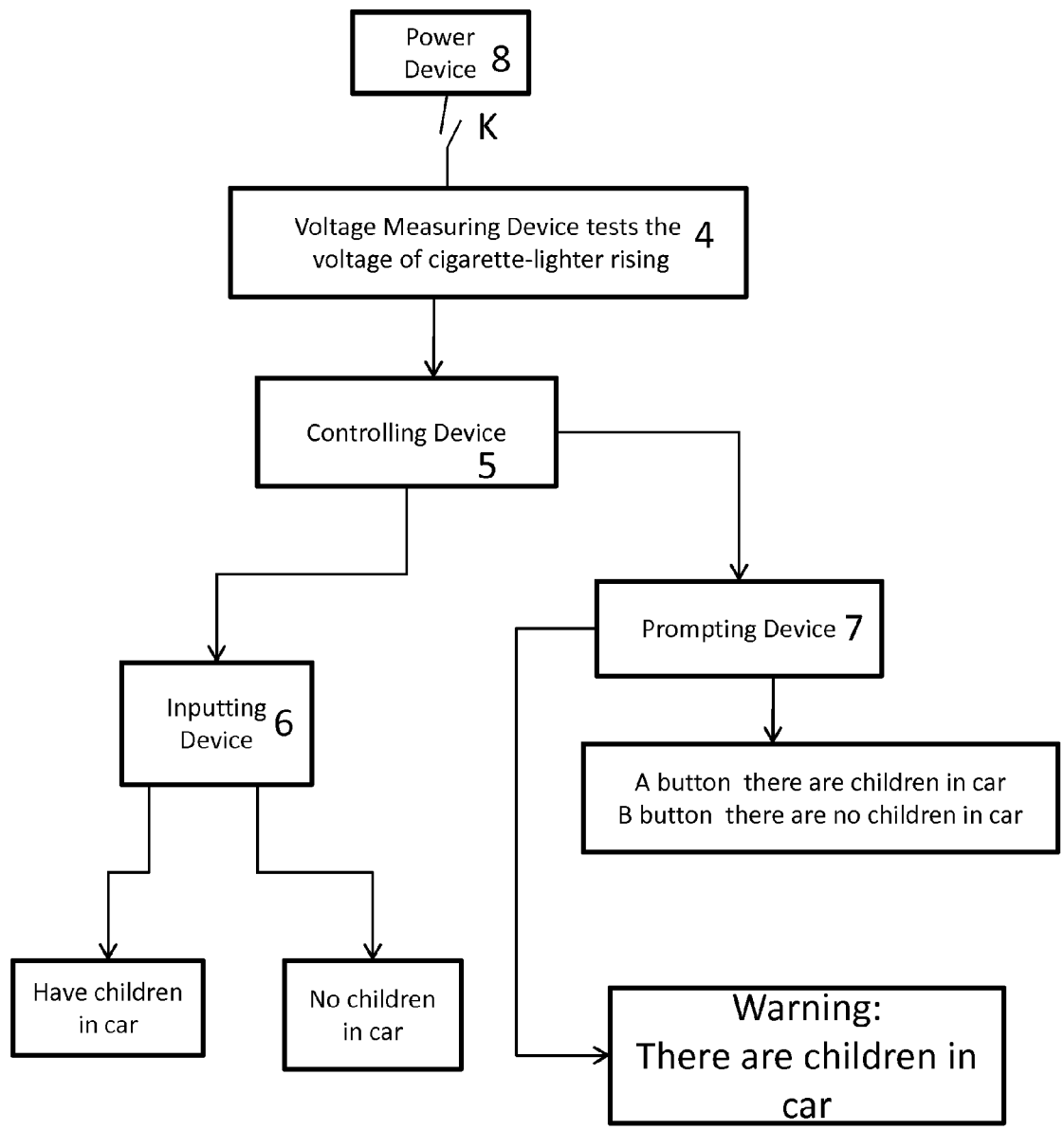
FIG. 3 is a working diagram 1 of the controlling device of the driver alarm of present invention.

Refer to FIG. 3, the driver alarm's working theory is described as the following:

Insert the cylindrical plug 2 of the driver alarm into a socket 30 of a cigarette-lighter in the car, the driver alarm is powered on and starts working. When the car's engine is started, the measuring device measures a voltage rising signal from the cigarette-lighter socket, and immediately reports to the controlling device that the engine is turned on. The controlling device instantly sends a <query instruction> to the inputting device 6 and the prompting device after receiving the report of the car engine being turned on from the voltage measuring device.

Then, the three push-buttons start to blink, and at the mean time the controlling device sends <query instruction> to the prompting device, and then the prompting device begins to speak out: "please push button A if children are in the car, please push button B if NO children are in the car."

If the driver pushes button A (the "Yes" button), the controlling device sends out a <warning instruction> to the prompting device, the prompting device begins to speak: "There are children inside the car, please put seatbelt on for the children"; at the same time, the response of <pushing button A> (children are in the car) is saved into a memory (occupancy status memory register) in the controlling device.

If the driver pushes button B, no <warning instruction> is sent out, and the response of <pushing button B> is saved into the memory (occupancy status memory register).

Figure 4:
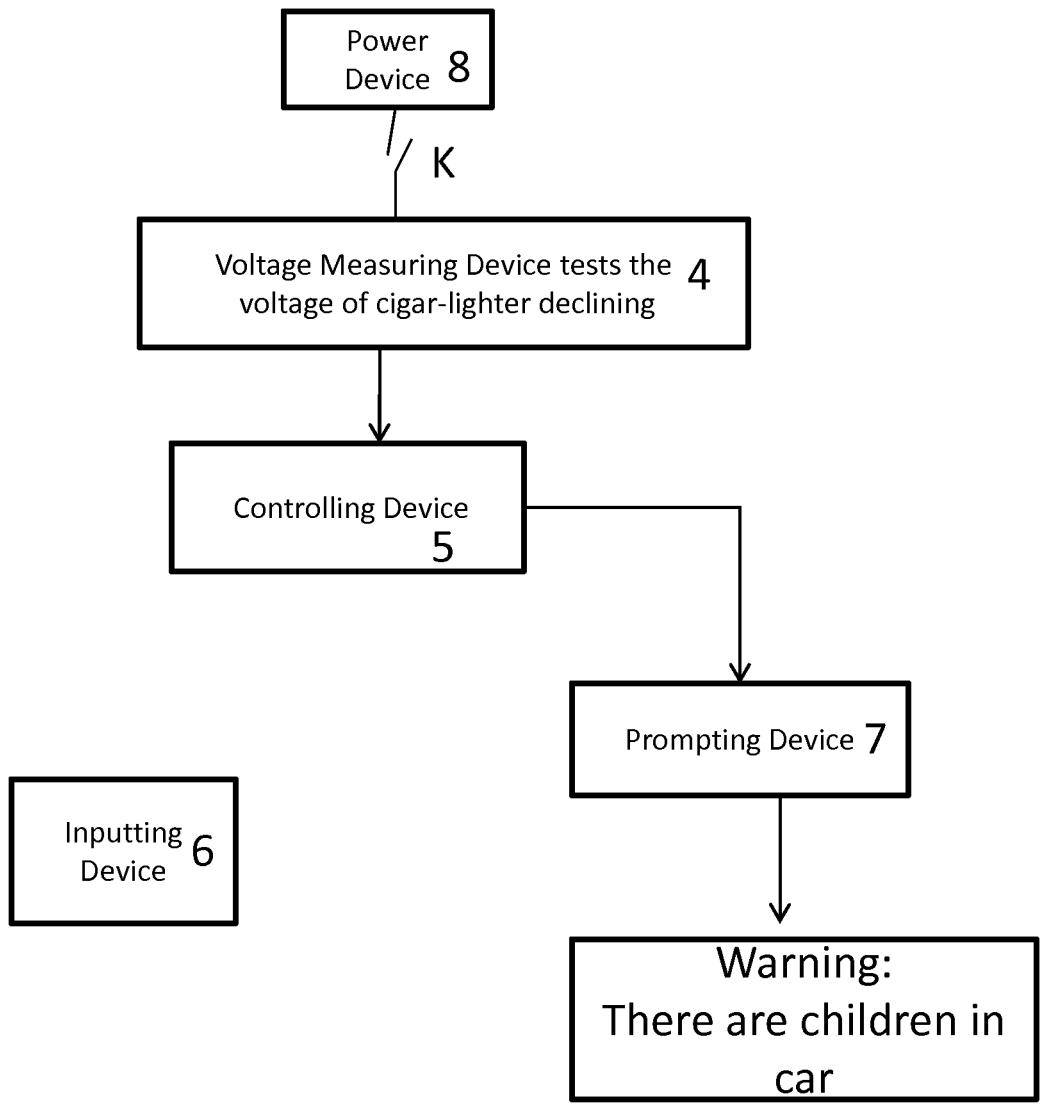
FIG. 4 is a working diagram 2 of the controlling device of the driver alarm of present invention.

As shown in FIG. 4, when the car engine is stopped, the measuring device measures that the voltage of the cigarette-lighter socket in the car declines and immediately reports this to the controlling device that the car engine is turned off; the controlling device then starts to search and retrieve the saved value from the occupancy status memory register; if the status value is "NO" indicating there are NO children inside the car, then nothing further needs to be done; but if the status value is "Yes" indicating there ARE children inside the car, then the controlling device will send a <warning instruction> to the prompting device, the prompting device will begin to speak: "There are children inside the car, please bring them out of the car. It is dangerous to leave them alone inside the car." The prompting device may repeat the warning a few more times.

Button C is the stop button. If button C is pushed, then the prompting device (or the whole driver alarm) stops to speak warnings when the service is no longer needed.

If/when no power is available in the cigarette-lighter socket when the car engine is stopped, then the battery box (as shown in FIG. 5) will be a power supply source instead.

The detailed descriptions of the examples of this invention are used to help the public to understand the invention. Referring to the examples, there can be a lot of different embodiments, and these different embodiments fall in the claim scope of this invention.

What is claimed is:

1. A driver alarm for preventing children from being left inside of a car includes:
   a power device for providing electrical power to the driver alarm;
   a voltage measuring device for measuring voltage change of a cigarette-lighter in the car and reporting the voltage change to a controlling device, rising of the voltage change indicating the car being started up, declining indicating the car engine being turned off;
   the controlling device for controlling a prompting device to issue a warning relating to children in the car when rising or declining of the voltage change of the cigarette-lighter;
   the prompting device for issuing a warning relating to children in the car.

2. The driver alarm of claim 1, wherein further includes:
   an inputting device for deepening driver's impression whether any children is inside of the car or not and reporting it to the controlling device.

3. The driver alarm of claim 1, wherein the working program is:
   when the car starts up and the voltage of cigarette-lighter rises, the measuring device reports rising of the voltage of cigarette-lighter to the controlling device, which sends warning instruction to the promoting device to issue warning relating to children in the car; when the car engine is tuned off and the voltage of cigarette-lighter declines, the measuring device reports declining of the voltage of cigarette-lighter to the controlling device, which sends warning instruction to the promoting device to issue warning relating to children in the car.

4. The driver alarm of claim 2, wherein the working program is:
   when the car starts up and the voltage of cigarette-lighter rises, the measuring device reports rising of the voltage of cigarette-lighter to the controlling device, which sends a query instruction to the inputting device, as well as a prompting instruction to the prompting device to ask the driver for an answer; the inputting device reports driver's answer to the controlling device, the controlling device sends a warning instruction to the promoting device to issue a warning relating to children in the car if the driver's answer is "Yes" (having children);
   when the car engine stops up and the voltage of cigarette-lighter declines, the measuring device reports declining of the voltage of cigarette-lighter to the controlling device, which sends a warning instruction to the promoting device to issue a warning relating to children in the car if the driver's answer is "Yes" (having children).

5. The driver alarm of claim 1, wherein said power device has a plug, which can be inserted into a cigarette-lighter socket in a car, and the cigarette-lighter socket in the car becomes a power source of the driver alarm.

6. The driver alarm of claim 1, wherein the power device has a battery box, said power device becomes an independent electronic power source for said driver alarm by inserting batteries or rechargeable batteries into the battery box.

7. The driver alarm that of claim 1, wherein said prompting device has a power switch to cut off the power, and to stop the prompting device to work.

8. The driver alarm of claim 1, wherein said inputting device has two push-buttons, one is YES push-button (having children), another is NO push-button (no children).

9. The driver alarm that of claim 8, wherein a stop button can be added to said inputting device, if the driver push the stop button down, the prompting device stops giving out prompting sound.

10. The driver alarm that of claim 1 further has a power socket for supplying power to electric equipments in the car, during working time of said driver alarm, the power socket can be used as a power supplying apparatus for other electric equipments in the car too.

* * * * *